(12) United States Patent
Lin

(10) Patent No.: US 7,036,787 B1
(45) Date of Patent: May 2, 2006

(54) DISPLAY STRUT ADJUSTING STRUCTURE

(75) Inventor: Yung-Sheng Lin, Taipei (TW)

(73) Assignee: Taiwan Thick-Film Ind. Corp., Taipei (TW)

( * ) Notice: Subject to any disclaimer, the term of this patent is extended or adjusted under 35 U.S.C. 154(b) by 0 days.

(21) Appl. No.: 11/049,713

(22) Filed: Feb. 4, 2005

(51) Int. Cl.
F16M 5/00 (2006.01)

(52) U.S. Cl. .............. 248/676; 248/123.11; 248/125.2; 248/162.1; 248/292.13; 248/920

(58) Field of Classification Search ................ 248/676, 248/123.11, 125.2, 125.3, 161, 162.1, 414, 248/157, 423, 292.13, 176.3, 334.1, 917, 248/919–923
See application file for complete search history.

(56) References Cited

U.S. PATENT DOCUMENTS

| 6,532,628 B1 * | 3/2003 | Kim | 16/342 |
| 6,702,238 B1 * | 3/2004 | Wang | 248/125.8 |
| 6,712,321 B1 * | 3/2004 | Su et al. | 248/123.11 |
| 6,769,657 B1 * | 8/2004 | Huang | 248/278.1 |
| 6,796,537 B1 * | 9/2004 | Lin | 248/162.1 |
| 6,918,564 B1 * | 7/2005 | Yen et al. | 248/404 |
| 2005/0184215 A1 * | 8/2005 | Lin | 248/676 |

FOREIGN PATENT DOCUMENTS

TW 539202 U 6/2003

* cited by examiner

Primary Examiner—Korie Chan
(74) Attorney, Agent, or Firm—Birch, Stewart, Kolasch & Birch, LLP

(57) ABSTRACT

A display strut adjusting structure is located on a base seat of a display, comprises an altitude adjusting device and an angle adjusting device. An arc-shaped suppressing plate is located on a sliding plate of the altitude adjusting device, which can push the torsion member of an outer frame component with stability thus enhance the smoothness of the altitude adjusting operation. A braking bar at the end of the outer frame component restricts rotation, and allows strengthening of the stability of the adjusted angle between the display strut adjusting structure and the base seat. A concave ring is designed on the braking bar, when depressed the braking bar causes the concave ring to align with the pivot end, the outer frame component will rotate through the concave ring in relation to the pivot end, thus, adjusting the angle of the display strut adjusting structure and the base seat.

4 Claims, 6 Drawing Sheets

DISPLAY STRUT ADJUSTING STRUCTURE

FIELD OF THE INVENTION

The present invention relates to a display strut adjusting structure, more particularly, to a display strut adjusting structure that having both an altitude adjusting function and an angle adjusting function.

BACKGROUND OF THE INVENTION

In order to of coordinate with the modern life style, the sizes of the video or image devices are smaller and lighter gradually. Therefore, in order to coordinate with the photo-electric technology and the semiconductor manufacturing technology, the development of Flat Panel Display such as the LCD, OLED or PDP, has gradually become mainstream the of the displays. And since the sizes of the screen of such displays are relatively increasing from 15 inches to 17 inches, thus much attention is paid to the strut structure used to sustain those displays.

To satisfy the requirements of different users, the visible region of the display can be adjusted by conventional strut structure. Such strut structure installs with an altitude adjusting device, so that the display is mobile on the strut structure causing an additional height adjusting function. The R.O.C Patent Publication No. 539202 discloses an "Altitude adjusting device of Display and Display Module having Such Device", such altitude adjusting device includes an outer frame component, a sliding component, an elongated component and a balancing component. The outer frame component comprises a frame body which is located at a display base seat, the interior of the frame body defines a up-down directed slidable groove, a slidable component is then glidingly located on the above slidable groove of the frame body. The elongated component, which is elongated along the up-down direction, includes a base linking end that is connected to the slidable component and a top linking end that is exposed to the top of the frame body that is used to connect to the display. The balancing component includes: a rotating shaft that is rotatably pivoted to the slidable component, and a torsion member that is coiled on the rotating shaft. The torsion member can be stretched downwards. The torsion member comprises two opposite ends that are connected to the rotating shaft and the outer frame component respectively. The torsion member permanently exerts a force causing the slidable component to shift upwards and balanced the weight of the display.

It is worth to mention that, although the above height control device has been improved to achieve a stronger structure, the assembly component is still having too many varieties thus enhances the complexity of the assembly and the product cost. Moreover, this kind of adjusting device only ensures height adjusting function and lacks an angle adjusting function between the strut structure and the display base seat, thus having a poor usability.

SUMMARY OF THE INVENTION

It is a primary object of the present invention is to provide a display strut adjusting structure that apart from having both altitude adjusting function and angle adjusting function, as well as improving the smoothness in adjusting the altitude and strengthen the stability after the angle has been adjusted.

In order to achieve the foregoing objects, the display strut adjusting structure of the present invention is located on a base seat of a display, comprising a altitude adjusting device includes a sliding plate, the two sides of the sliding plate having a pair of sliding grooves, and an arc-shaped suppressing plate is located on the sliding plate; an outer frame component having a pair of sliding tracks located on the two sides of the outer frame component, the pair of sliding tracks is embedded into the pair of sliding grooves, so that the sliding plate can glide within the outer frame component; at least one torsion member includes a fixed end and a curly end, the fixed end is fixed on the top of the outer frame component, the arc-shaped suppressing plate is suppressed on the curly end, to push the curly end and allow the torsion member to produce an elongating motion or a coiling motion, so as to shift the relative location of the sliding plate on the outer frame component, thus adjusting the altitude of the display; and an angle adjusting device, comprising: a pivotal element which is fixed on the base seat, the two sides of the pivotal element having a pivot end respectively, the two pivot ends are pivotal to the ends of the outer frame component, the angle of display strut adjusting structure and the angle of the base seat can be adjusted by the pivotal element; a braking bar which runs through the end of the outer frame component and located on one side of the pivot end, one end of the braking bar having a reduced portion, and a concave ring is located on the braking bar; a compression spring is disposed on the reduced portion of the braking bar, wherein the braking bar is supported by the elasticity of the compression spring, the braking bar will continue its contact with the pivot end under a normal condition, so as to restrict the rotation of the outer frame component, when the braking bar is depressed, causing the concave ring of the braking bar aligns with the pivot end, the outer frame component can rotate through the concave ring in relation to the pivot end, thus, adjusting the angle of the display strut adjusting structure and the angle of the base seat, after the angle has been adjusted, through the elastic restoring force of the compression spring, the braking bar will contact the pivot end again and localized.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
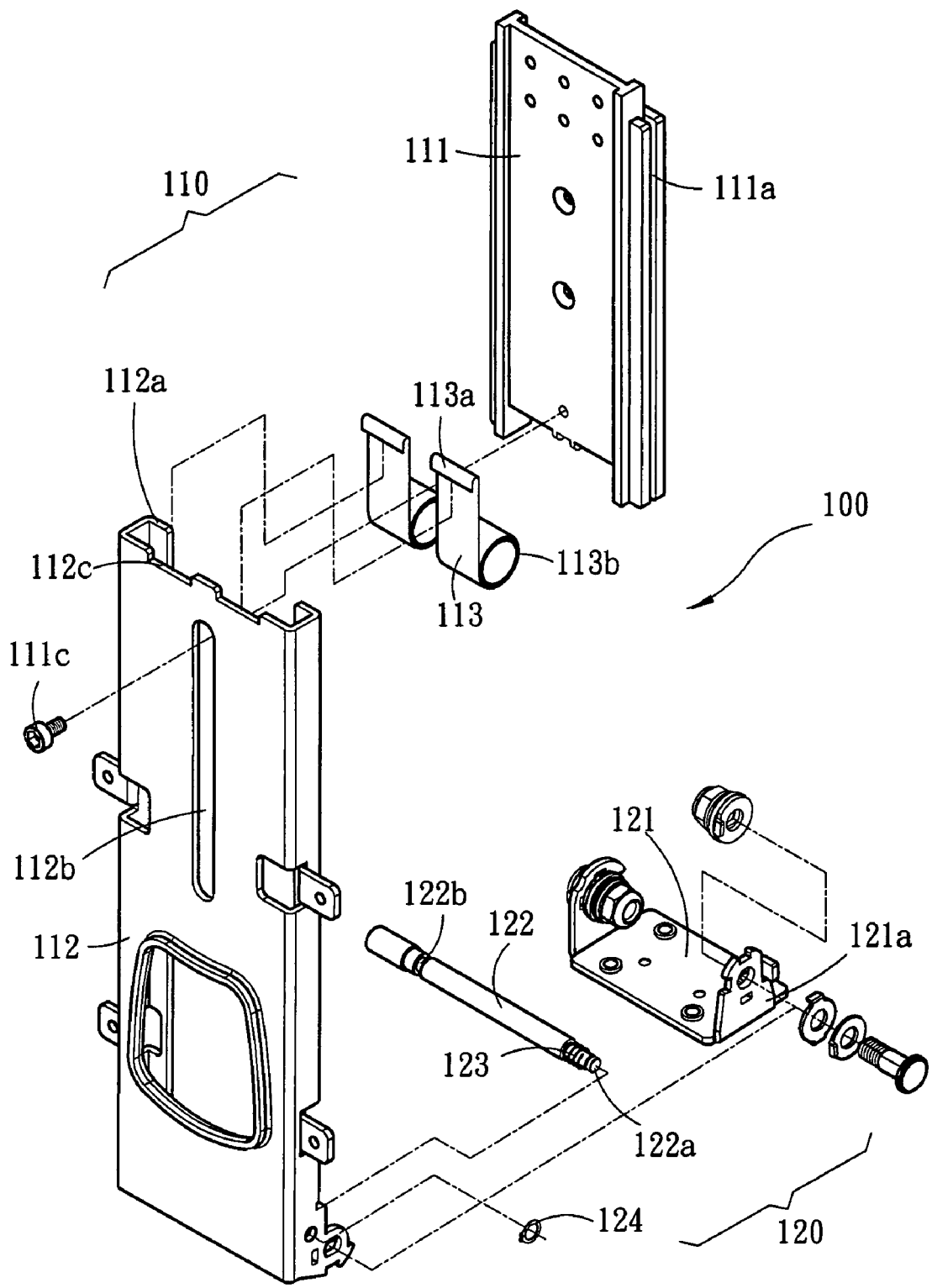
FIG. 1 is a perspective view of a preferred embodiment of the present invention.
Figure 2:
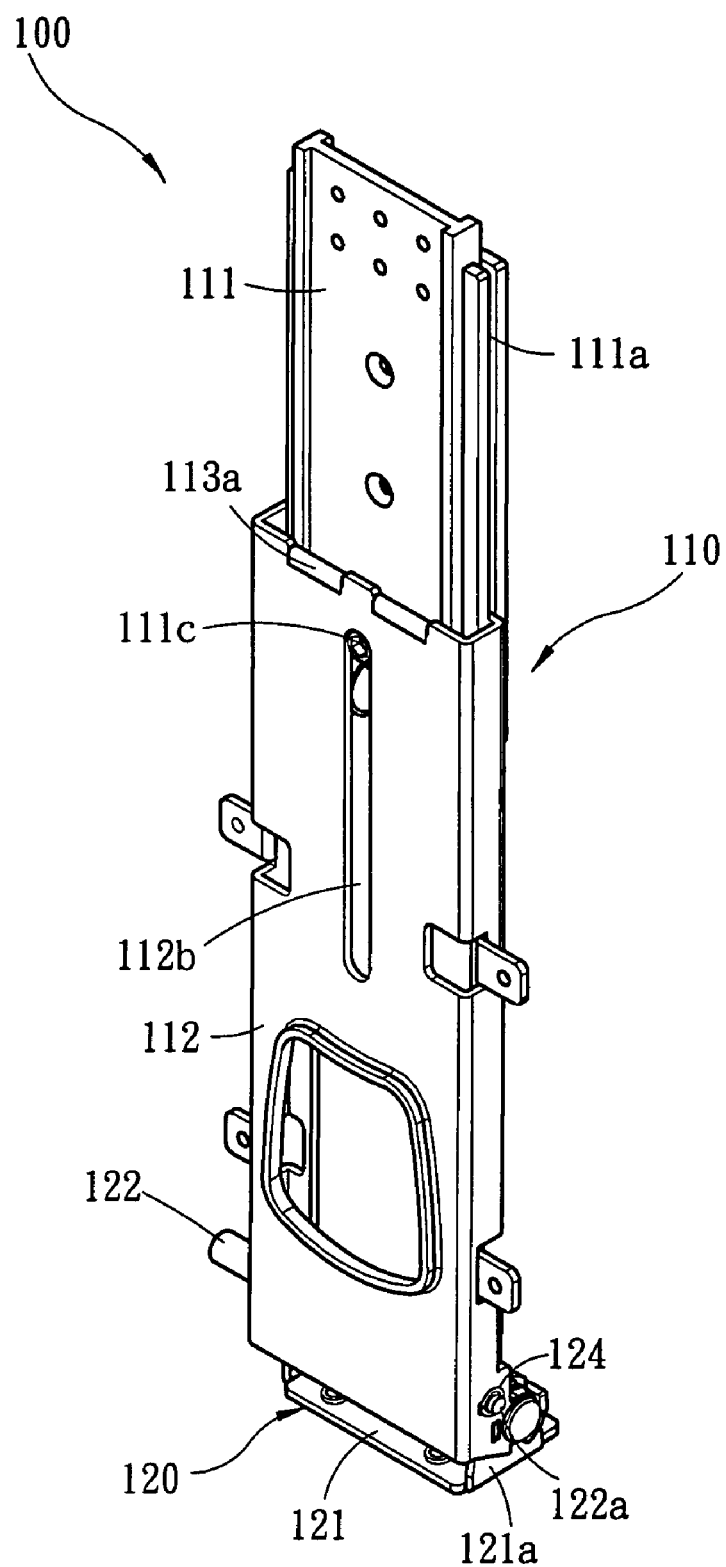
FIG. 2 is a perspective view of a preferred embodiment of the present invention at a visual angle.
Figure 3:
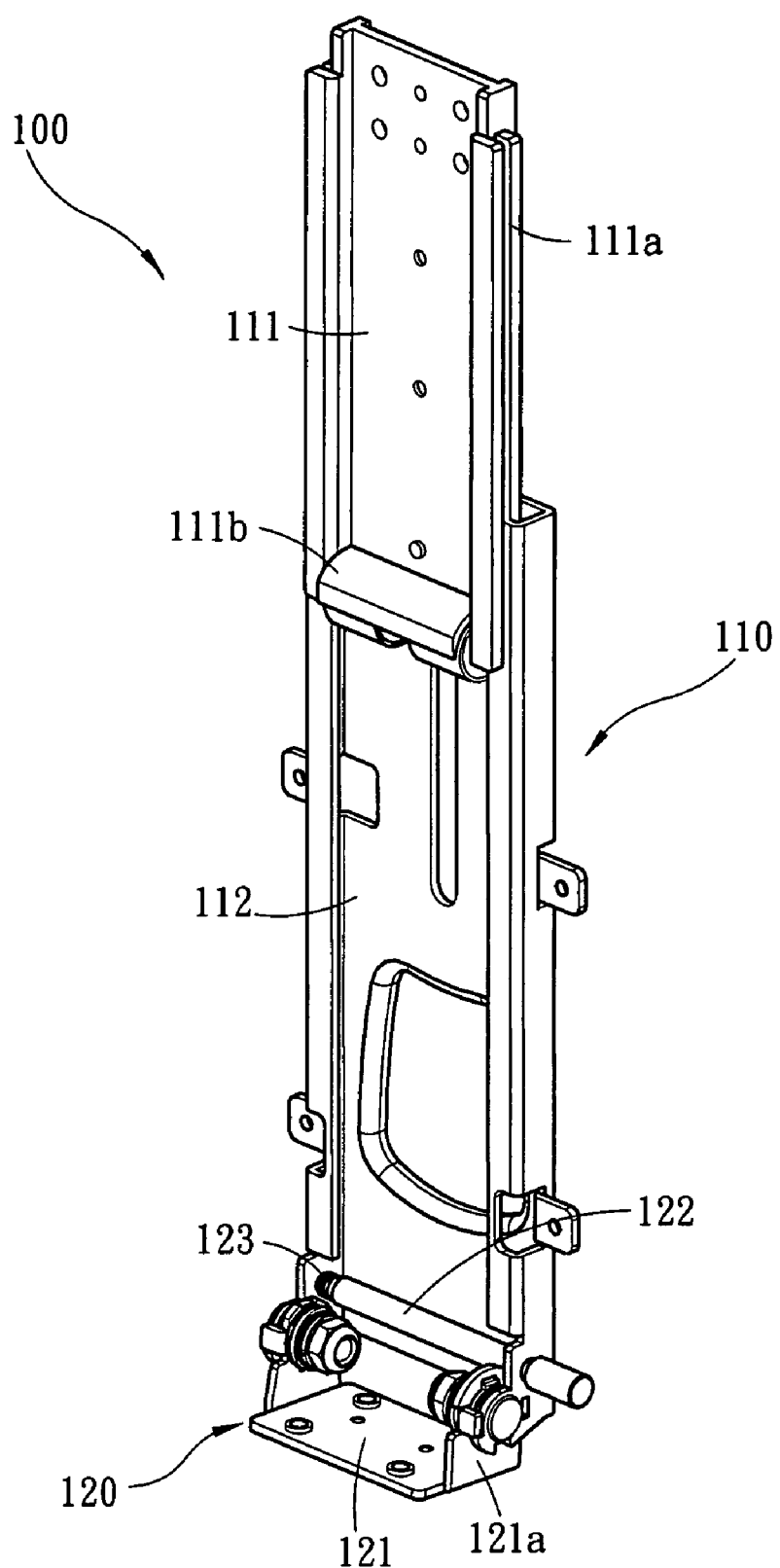
FIG. 3 is a perspective view of a preferred embodiment of the present invention at another visual angle.
Figures 4A, 4B:
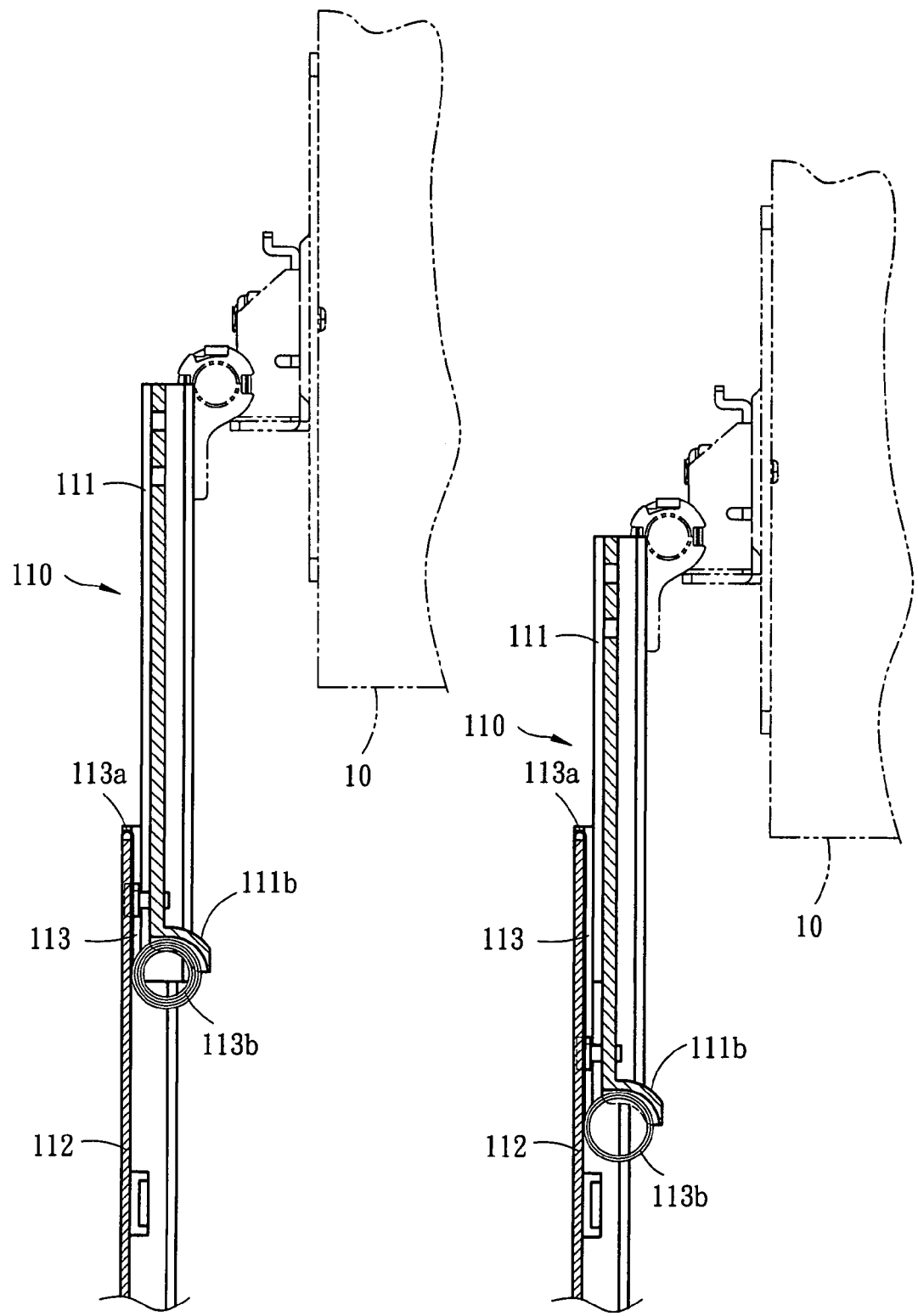
FIGS. 4A and 4B are the perspective views of the present invention in motion.
Figure 6A:
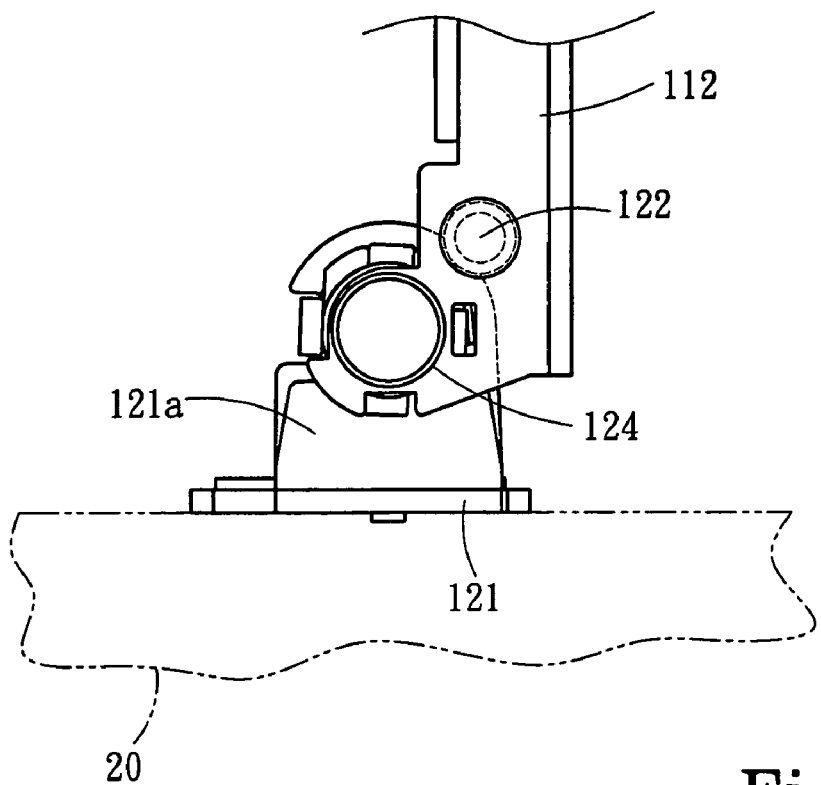
FIGS. 6A and 6B are the side views of the present invention before adjustment and after adjustment.
Figure 6B:
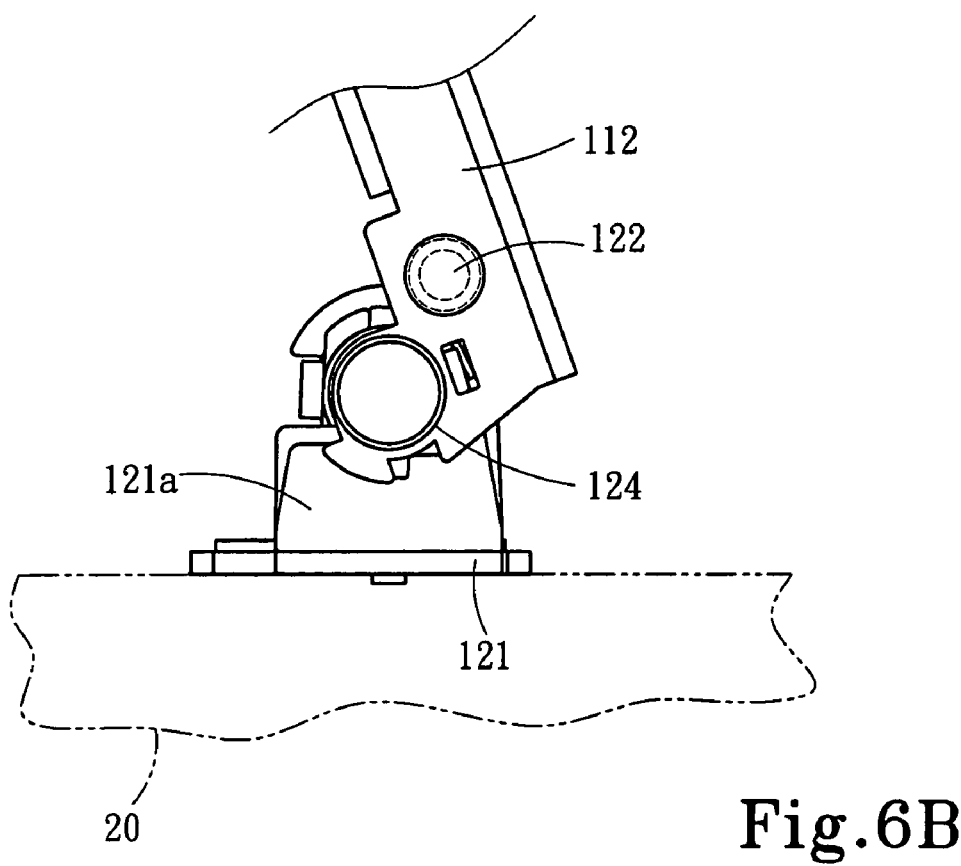

Please refer to FIGS. 1, 2 and 3, the present embodiment of the invention is about a display strut adjusting structure 100, mainly comprises a altitude adjusting device 110 and an angle adjusting device 120. The altitude adjusting device 110 is suitable to connect with a display 10 (as shown in FIG. 4A), in order to adjust the height of the display 10. The angle adjusting device 120 is suitable to connect with a base seat 20 (as shown in FIG. 6A), in order to adjust the angle of the display strut adjusting structure 100 and the angle of the base seat 20, so as to change the visual angle of the display 10.

In addition, please refer to FIGS. 1, 2 and 3; provide a further explanation on the altitude adjusting device 110. The altitude adjusting device 110 mainly comprises a sliding plate 111, an outer frame component 112 and at least one torsion member 113 (two torsion member 113 is shown in this embodiment). Wherein, the two sides of the sliding plate 111 having a pair of sliding grooves 111a and an arc-shaped suppressing plate 111b is located on the sliding plate 111. A pair of sliding tracks 112a is located on the two sides of the outer frame component 112. The pair of sliding tracks 112a can be embedded into the pair of sliding grooves 111a, so that the sliding plate 111 can glide within the outer frame component 112. The torsion member 113 (such as a torsion elastic piece) includes a fixed end 113a and a curly end 113b. The fixed end 113a is fixed on the top of the outer frame component 112. The arc-shaped suppressing plate 111b is suppressed on the curly end 113b. In the present embodiment, in order to strength the effect of orientation, the fixed end 113a of the torsion member 113 is fixed in a notch 112c located on the top of the outer frame component 112. Certainly, the torsion member 113 is not limited to only torsion elastic piece as shown in the present embodiment; the torsion member 113 can also be any component that can store a restoring torsion under a process of outward extension.

Please refer to FIGS. 1, 2, 3, 4A and 4B. When a user's hand exert a force to depress the sliding plate 111, the arch-shaped suppressing plate 111b of the sliding plate 111 with push the curly end 113b of the torsion member 113 to produce an elongating motion at the same time, so as to shift the relative location of the sliding plate 111 on the outer frame component 112. Once the user's hand releases the sliding plate 111, affecting by the balancing effect of the torsion member 113, the sliding plate 111 together with the display 10 will cease moving automatically, thus allowing the altitude of the display 10 to reduce expectedly resulting in a function of adjusting the altitude of the display 10. On the other hand, when the user's hand exerts an upward pulling force on the sliding plate 111, the curly end 113b of the torsion member 113 will curl up. And when the user's hand releases the sliding plate 111, affecting by the balancing effect of the torsion member 113, the sliding plate 111 together with the display 10 will stop shifting automatically causing the display 10 to elevate to a predetermined altitude.

It is worth to notice that, since the profile of the arch-shaped suppressing plate 111b is similar to the profile of the curly end 113b of the torsion member 113. Therefore, the arch-shaped suppressing plate 111b can steadily push the torsion member 113 of the outer frame component 112, so as to enhance the smoothness when adjusting the altitude.

In addition, please refer to FIGS. 1 and 2. An additional position restricting slit 112b is located on the outer frame component 112. An additional position restricting rod 111c is located on the sliding plate 111, and one end of the position restricting rod 111c is movable within the position restricting slit 112b, so as to strength the localization between the sliding plate 111 and the outer frame component 112, and to allow a smoother and more accurate sliding movement of the sliding plate 111 on the outer frame component 112.

Figure 5A:
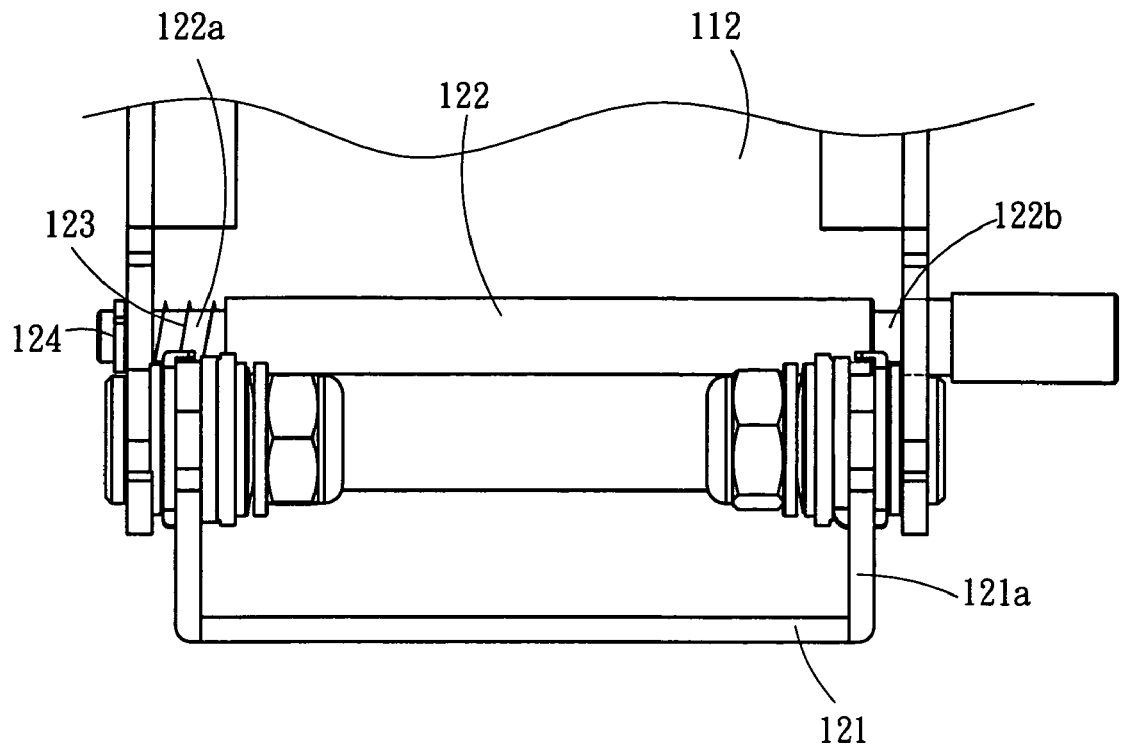
FIGS. 5A and 5B are the perspective views of the present invention in another motion.
Figure 5B:
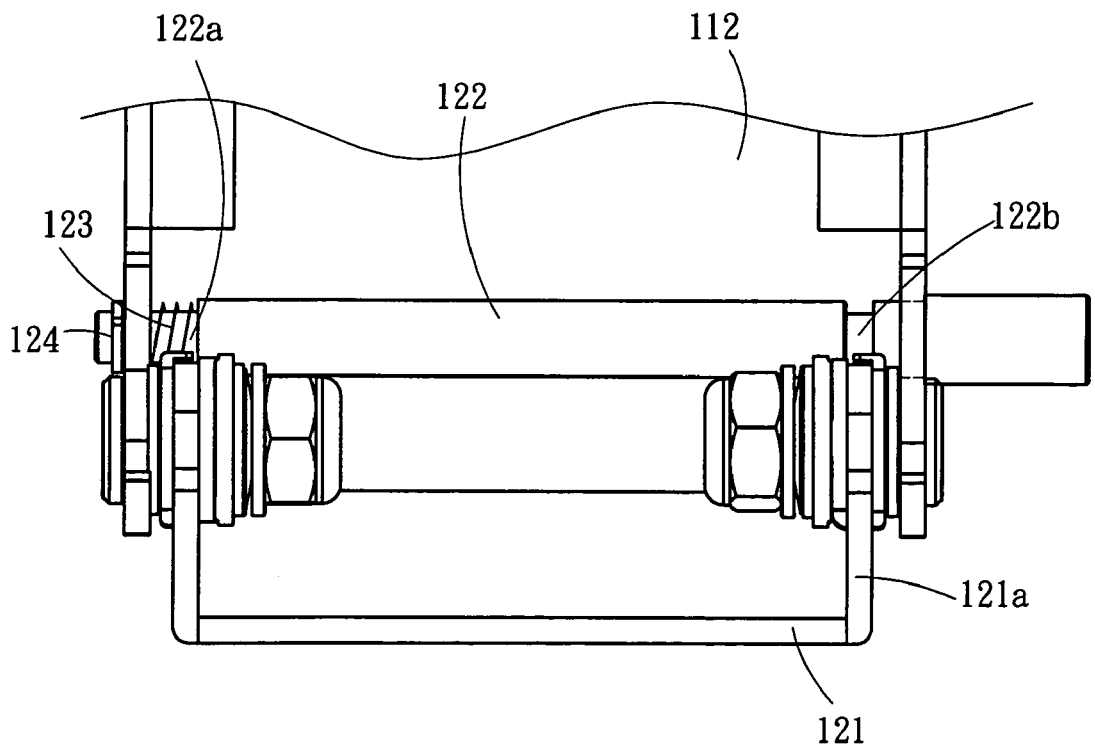

In addition, the angle adjusting device 120 is further explained according to FIGS. 1 and 5A. The angle adjusting device 120 mainly includes a pivotal element 121, a braking bar 122 and a compression spring 123. The pivotal element 121 is fixed on the base seat 20. The two sides of the pivotal element 121 having a pivot end 121a respectively protruding outwards. The two pivot ends 121a are pivotal to the ends of the outer frame component 112. The braking bar 122 runs through the end of the outer frame component 112, the end that is relative to the side of the pivot end 121a on the pivotal element 121. One end of the braking bar 122 having a reduced portion 122a, and a concave ring 122b is located on the braking bar 122. After the reduced portion 122a of the braking bar 122 ran through the outer frame component 112, it is fixed by a C-shaped ring 124 for example. Moreover, the compression spring 123 is disposed on the reduced portion 122a. The braking bar 122 is supported by the elasticity of the compression spring 123. The braking bar 122 will continue its contact with the pivot end 121a under a normal condition, so as to restrict the rotation of the outer frame component 112.

Please refer to FIGS. 5A, 5B, 6A and 6B. When the user depresses the braking bar 122, causing the concave ring 122b of the braking bar 122 aligns with the pivot end 121a. The outer frame component 112 can rotate through the concave ring 122b in relation to the pivot end 121a, thus, adjusting the angle of the display strut adjusting structure 100 and the angle of the base seat 20. After the angle has been adjusted, through the elastic restoring force of the compression spring 123, the concave ring 122b on the braking bar 122 will leave the original location relative to the pivot end 121a. So that the braking bar 122 will contact the pivot end 121a again and localized.

In summary, the display strut adjusting structure 100 of the present invention has at least the following merits:

1. The display strut adjusting structure 100 of the present invention comprises an altitude adjusting device 110 and an angle adjusting device 120 and having both altitude adjusting function and angle adjusting function.

2. The display strut adjusting structure 100 of the present invention, wherein the sliding plate 111 of the altitude adjusting device 110 having an arch-shaped suppressing plate 111b. Since the profile of the arch-shaped suppressing plate 111b is similar to the profile of the torsion member 113 of the outer frame component 112 this can enhance the smoothness when adjusting the altitude.

3. The display strut adjusting structure 100 of the present invention, the rotation of the outer frame component 112 is restricted by a braking bar 122, in order to strengthen the stability of the adjusted angle between the display strut adjusting structure 100 and the base seat 20. And a concave ring 122b is designed on the braking bar 122. When the user depresses the braking bar 122, causing the concave ring 122b of the braking bar 122 aligns with the pivot end 121a, the outer frame component 112 rotate through the concave ring 122b in relation to the pivot end 121a, thus, adjusting the angle of the display strut adjusting structure 100 and the angle of the base seat 20.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A display strut adjusting structure is located on a base seat of a display, comprising:

an altitude adjusting device, comprising:

a sliding plate, the two sides of the sliding plate having a pair of sliding grooves, and an arc-shaped suppressing plate is located on the sliding plate;

an outer frame component having a pair of sliding tracks located on the two sides of the outer frame component, the pair of sliding tracks is embedded into the pair of sliding grooves, so that the sliding plate can glide within the outer frame component;

at least one torsion member includes a fixed end and a curly end, the fixed end is fixed on the top of the outer frame component, the arc-shaped suppressing plate is suppressed on the curly end, to push the curly end and allow the torsion member to produce an elongating motion or a coiling motion, so as to shift the relative location of the sliding plate on the outer frame component, thus adjusting the altitude of the display; and an angle adjusting device, includes:

a pivotal element which is fixed on the base seat, the two sides of the pivotal element having a pivot end respectively, the two pivot ends are pivotal to the ends of the outer frame component, the angle of the display strut adjusting structure and the angle of the base seat can be adjusted by the pivotal element;

a braking bar which runs through the end of the outer frame component and located on one side of the pivot end, one end of the braking bar having a reduced portion, and a concave ring is located on the braking bar;

a compression spring is disposed on the reduced portion of the braking bar, wherein the braking bar is supported by the elasticity of the compression spring, the braking bar will continue its contact with the pivot end under a normal condition, so as to restrict the rotation of the outer frame component, when the braking bar is depressed, causing the concave ring of the braking bar align with the pivot end, the outer frame component can rotate through the concave ring in relation to the pivot end, thus, adjusting the angle of the display strut adjusting structure and the angle of the base seat, after the angle has been adjusted, through the elastic restoring force of the compression spring, the braking bar will contact the pivot end again and localized.

2. The display strut adjusting structure according to claim 1, wherein the outer frame component further includes a position restricting slit and a position restricting rod is located on the sliding plate, one end of the position restricting rod is movable within the position restricting slit, so as to strength the localization between the sliding plate and the outer frame component, and to allow a smoother and more accurate sliding movement of the sliding plate on the outer frame component.

3. The display strut adjusting structure according to claim 1, wherein the torsion member can be a torsion elastic piece.

4. The display strut adjusting structure according to claim 1, wherein the reduced portion of the braking bar after running through the outer frame component, can be fixed by a C-shaped ring.

* * * * *